(12) United States Patent
Kontola et al.

(10) Patent No.: US 7,986,918 B2
(45) Date of Patent: Jul. 26, 2011

(54) METHOD FOR REDUCING THE EFFECT OF INTERFERENCES IN A RECEIVER AND AN ELECTRONIC DEVICE

(75) Inventors: Ilkka Kontola, Julkujärvi (FI); Samuli Pietilä, Tampere (FI); Harri Valio, Kämmenniemi (FI)

(73) Assignee: Nokia Corporation, Espoo (FI)

( * ) Notice: Subject to any disclaimer, the term of this patent is extended or adjusted under 35 U.S.C. 154(b) by 584 days.

(21) Appl. No.: 10/865,489

(22) Filed: Jun. 10, 2004

(65) Prior Publication Data

US 2004/0266342 A1  Dec. 30, 2004

(30) Foreign Application Priority Data

Jun. 10, 2003 (FI) ..................................... 20035089

(51) Int. Cl.
*H04B 1/00* (2006.01)
(52) U.S. Cl. ................. 455/63.1; 455/67.11; 455/67.13; 455/296
(58) Field of Classification Search ................. 455/12.1, 455/63.1, 3.01, 427, 67.11, 67.13, 296
See application file for complete search history.

(56) References Cited

U.S. PATENT DOCUMENTS

| | | | |
|---|---|---|---|
| 4,853,972 A | 8/1989 | Ueda et al. | 455/83 |
| 5,732,341 A | 3/1998 | Wheatley, III | 455/234.1 |
| 6,107,960 A | 8/2000 | Krasner | 342/357.09 |
| 6,374,096 B1 * | 4/2002 | Parr | 455/226.1 |
| 6,442,375 B1 | 8/2002 | Parmentier | |
| 2001/0050630 A1 * | 12/2001 | Fujii | 342/357.02 |
| 2002/0055342 A1 * | 5/2002 | Walley | 455/226.2 |

FOREIGN PATENT DOCUMENTS

| | | |
|---|---|---|
| EP | 1091497 | 4/2001 |
| EP | 1122554 | 8/2001 |
| EP | 1253720 A1 | 10/2002 |
| JP | 7-203512 | 8/1995 |
| JP | 2001-44863 | 2/2001 |
| WO | 9936795 | 7/1999 |
| WO | WO 01/15329 A | 3/2001 |

OTHER PUBLICATIONS

Japanese Office Action dated Mar. 10, 2008 (2 pages) with English translation (4 pages).
Abstract of Publication No. JP7203512; Publication date: Aug. 4, 1995.
Patent Abstracts of Japan: Publication No. 2001-044863, Date of publication: Feb. 16, 2001.

\* cited by examiner

*Primary Examiner* — Edward Urban
*Assistant Examiner* — Fayyaz Alam

(57) ABSTRACT

The invention relates to a method for attenuating interferences in a positioning receiver, wherein a signal transmitted by the satellites of a positioning system is received, and the received signal is amplified. In the positioning receiver a noise level of the received signal is determined, the existence of interferences is established on the basis of changes of the determined noise level, and the amplification is controlled on the basis of the noise level of the signal received otherwise than during interference. The invention also relates to an electronic device, wherein the method is applied, as well as to a program, with which the method can be implemented in connection with the positioning receiver.

17 Claims, 3 Drawing Sheets

METHOD FOR REDUCING THE EFFECT OF INTERFERENCES IN A RECEIVER AND AN ELECTRONIC DEVICE

CROSS-REFERENCE TO RELATED APPLICATIONS

This application claims priority under 35 USC §119 to Finnish Patent Application No. 20035089 filed on Jun. 10, 2003.

FIELD OF THE INVENTION

The present invention relates to a method for reducing the effect of interferences in a positioning receiver, wherein a signal sent by the satellites of a positioning system is received. The invention also relates to an electronic device, which comprises at least a positioning receiver, an antenna for receiving a signal transmitted by the satellites of the positioning system in the positioning receiver, an amplifier for amplifying the received signal, and means for attenuating interferences. The invention also relates to a program, which comprises machine-executable program commands for attenuating interferences in the positioning receiver, wherein the signal transmitted by the satellites of the positioning system are received, and the received signal is amplified.

BACKGROUND OF THE INVENTION

Devices are known, in which a positioning receiver is used for determining the location of the device. Such positioning receivers primarily rest on satellite-based positioning systems. In such positioning systems based on satellites, the positioning receiver attempts to receive a signal transmitted from satellites, which contain phase-modulated information, e.g. orbital parameters of the satellites. In practice, however, the signal strength of the signal received by the positioning receiver may be so attenuated, particularly indoors, that detection of the signal is difficult, and positioning cannot always be performed.

One known positioning system is the GPS system (Global Positioning System), which comprises more than 30 satellites, of which usually a maximum of 12 are simultaneously within the sight of a receiver. These satellites transmit e.g. Ephemeris data of the satellite, as well as time data of the satellite. A receiver to be used in positioning normally determines its position by computing the propagation time of a signal transmitted substantially simultaneously from several satellites belonging to the positioning system to the receiver. For positioning, the receiver must typically receive the signals of at least four satellites within sight, in order to be able to compute the position.

Each operating satellite of the GPS system transmits a so-called L1 signal at the carrier frequency of 1575.42 MHz. This frequency is also indicated with $154f_0$, where $f_0=10.23$ MHz. Furthermore, the satellites transmit a L2 signal at a carrier frequency of 1227.6 MHz, i.e. $120f_0$. The carrier of the L1 signal is further modulated by navigation information at a bit rate of 50 bit/s. The navigation information comprises information about the "health" and orbit of the satellite, parameters related to the local clock of the satellite, etc. In satellites of the GPS system, e.g. so-called atomic clocks are used as the local clock.

There are known devices having both the positioning receiver and means for performing mobile communication device functions, wherein an object of the device is to perform both positioning and to use the device as a mobile communication device. Typically, a frequency range around the frequency of 900 MHz, 1800 MHz and/or 1900 MHz has been reserved for the use of mobile communication systems. Some devices can be connected to two or even three mobile communication systems operating at a different frequency.

In addition, solutions have been developed, wherein it is possible to interconnect a separate mobile communication device and a positioning receiver. With this type of a system, it is possible to perform positioning functions as well as mobile communication device functions.

Particularly the transmitter of a mobile communication device forms strong signals at the frequency range of a mobile communication system and also at harmonic frequencies. This interference signal is wideband to the degree that the noise level of the frequency range used in the positioning rises. For example, a GSM transmission produces a primary transmission signal $f_{GSM}$ and an interfering signal $f_{GSMnoise}$. The wideband noise caused by a GSM transmission is illustrated in FIG. 1, where it can be seen that the wideband noise produced by GSM 1800 is most significant to the GPS band. Other noises that are disturbing in view of the GPS positioning receiver include e.g. such interference frequencies caused by a GSM transmission that occur in the GPS band. These interference signals are connected particularly through the antenna of the mobile communication device to the antenna of the positioning receiver, but some of them can be connected also inside the device, if the positioning receiver is implemented in connection with the mobile communication device.

Therefore, the reception of satellite signals of the positioning system is most difficult during transmission of a mobile communication device. Even if an aim has been to implement the structure of the device in a manner that such interference signals would not spread into the surrounding space, the device may radiate interference signals to some extent also right next to the device. Attenuating such interference signals inside the device itself is also troublesome. Thus, in a prior art device the interference radiation reaches the positioning receiver, in which case the positioning receiver is not necessarily capable of detecting weak signals transmitted by satellites, and the positioning fails. Sufficient attenuation of interference radiation is difficult with different radiation shields and grounding arrangements inside the device itself, and in many cases it would require increasing the size of the device. In some prior art devices an aim has been to solve this problem in such a manner that the positioning receiver is not in its operating mode when the mobile communication device is operating. This is cumbersome in practical use, because the user must turn off the mobile communication device in order to perform positioning. In a corresponding manner, the user must turn off the positioning receiver when he/she switches on the mobile communication device. Since the positioning often takes a long time, even several minutes, because of particularly weak signal intensity, the usability of such a device is not particularly good.

The function of radio transmitters is controlled by different orders of the authorities e.g. for the reason that radio transmitters will not cause unreasonable inconvenience to radio equipment and other electronic devices. However, in mobile communication devices functioning according to these types of orders, interferences may still occur, which are very harmful from the point of view of a positioning receiver functioning close to a mobile communication device. A reason for this is that the strength of the signals received by the positioning receiver is even below the thermal noise level. Thus, even a small additional interference may prevent the function of a positioning receiver.

In many mobile communication devices, a multi-stage output amplifier with a strong amplification is used in the transmitter. The interface between the stages of the amplifier is wideband, in which case this type of amplifier forms wideband noise, which can be tens of decibels above the thermal noise level. In addition, in many mobile communication devices, which function with a slightly wider frequency than the positioning receiver, there is only a low-pass filter between the booster amplifier of the transmitter and the antenna. Thus, the noise formed in the amplification stages of the booster amplifier is reduced only a little.

The emission of mobile communication devices using a Time Division Multiple Access (TDMA) technique is typically burst-like because e.g. the mobile communication device transmits only during some time periods. Previously, e.g. in the GSM system, only one time period of eight was reserved for one mobile communication device for one call. Thus, the time duration of the interference was relatively short in view of total time. Nowadays the situation has, however, changed, because for one GSM mobile communication device it is possible to in some cases reserve several time periods or all the eight time periods available for use in one channel. Thus, the interference affects the function of the positioning receiver practically throughout the entire call, or in the case of a data call whenever the mobile communication device transmits data.

Also, in many systems based on code division technique (CDMA, Code Division Multiple Access; WCDMA, Wideband CDMA), the mobile communication device transmits a signal, in practice, continuously throughout the entire call, which may cause the noise level to rise in the positioning receiver.

A strong signal from the transmitter of a mobile communication device covers the relatively much weaker signal of a positioning satellite, in which case the positioning is in practice prevented or slowed down considerably. Especially in the case of a burst interference, the adjustment of the positioning receiver is difficult to perform in such a manner that the effect of disturbances is as small as possible.

A solution according to prior art is the improvement of the interference suppressors in the transmitters of a mobile communication device. This is, however, not always possible in practice, because, for example, additional suppressors cannot be implemented in a mobile communication device e.g. because of lack of space. Additional suppressors may weaken the baseband/high frequency conversion performed in the transmitter of the mobile communication device, which increases the power consumption of the mobile communication device. Also, this type of additional suppressors cannot be easily assembled in mobile communication devices already manufactured and in use.

The interference problem can be aimed to be removed also in such a manner that the positioning receiver is switched off the antenna while the transmitter of the mobile communication device is functioning. This presumes that a switch and a control signal are arranged between the mobile communication device and the positioning receiver, which is not always possible, especially if these are implemented as separate devices. With the arrangement it is not possible to solve the attenuation of interference caused by other mobile communication device possibly close to the positioning receiver either.

Yet another solution according to prior art, which aims to decrease the effect of interferences, is based on that in the positioning receiver the digitized received signal is set to zero (in other words, some registers of the positioning receiver are zeroed) while the transmitter of the mobile communication device transmits. Such a solution is presented e.g. in the international patent application WO 99/36795 (based on the U.S. Pat. No. 6,107,960). This arrangement also presumes the control signal being arranged from the mobile communication device to the positioning receiver. In addition, the system suits poorly for such mobile communication devices, wherein the transmitter transmits either continuously during a call, or the amount of transmitting time periods reserved for the transmitter from all the available time periods is relatively large. Thus in practice, positioning cannot be performed during a call. This system cannot take into account the interferences caused by other mobile communication devices either.

In some countries it has been or will be made compulsory to provide the mobile communication device with the function whereby it can be positioned, particularly during an emergency call. In this case, the mobile communication device cannot be switched off while performing positioning. In practice this means that in connection with an emergency call, positioning in prior art systems is aimed to be performed by using a mobile communication network, which, as mentioned, is not always possible.

SUMMARY OF THE INVENTION

A purpose of the present invention is to implement an improved method for reducing the effect of interferences created in an electronic device in a positioning receiver located in the electronic device. The invention is based on the idea that the existence of interferences is aimed to be established on the basis of changes in noise level, in which case the total noise level prevailing during interference situations is not used in determining the amplification control value of the high frequency stage in the positioning receiver, the amplification level is controlled on the basis of the total noise levels measured otherwise than during the interferences. To put it more precisely, the present invention is primarily characterized in that a noise level is determined of the received signal in the positioning receiver, the existence of interferences is established on the basis of changes of the determined noise level, and the amplification is controlled on the basis of the noise level of the signal received otherwise than during the interference. The electronic device according to the present invention is primarily characterized in that the means for attenuating the interferences comprise means for determining a noise level of the received signal in the positioning receiver, means for establishing the existence of interferences on the basis of changes in the determined noise level, and means for controlling the amplification of the amplifier on the basis of the noise level of the signal received otherwise than during the interference. The program according to the present invention is primarily characterized in that the program also comprises machine-executable program commands stored on a computer readable medium for determining the noise level of a received signal in the positioning receiver, for establishing the existence of interferences on the basis of changes of the determined noise level, and for controlling the amplification of the amplifier on the basis of the noise level of the signal received otherwise than during the interference.

The present invention shows remarkable advantages over solutions of prior art. With the method according to the invention, the influence of the interferences caused by the transmitter of the electronic device as well as the other nearby sources of interference to the operation of the positioning receiver can be attenuated to a significant degree, in which case the positioning receiver can be kept in operation also when the mobile communication device is in operation. In this case, the user can, for example, during a call establish his/her location and, if necessary, keep track on the changes in his/her location. The user can transmit his/her position data via a phone call to the other party of the call. In addition, from an electronic device according to an advantageous embodiment of the invention, positioning data can be automatically transmitted e.g. during an emergency call, in which case it is easier and faster to direct help to the correct location than when prior art solutions are used. The arrangement according to the invention does not presume an interconnection between the mobile communication device and the positioning receiver either, because in order to attenuate the influences of the interferences, it is not necessary to transmit control signals from the mobile communication device to the positioning receiver. The method according to the invention makes it possible also for the positioning receiver to identify a burst interference and to adjust to the interference situation. Also, the positioning receiver does not need to have information on which mobile communication device is in question in the mobile communication system.

DESCRIPTION OF THE DRAWINGS

In the following, the invention will be described in more detail with reference to the appended drawings, in which.

DETAILED DESCRIPTION OF THE INVENTION

In the following, the invention will be exemplified by an electronic device 1 illustrated in FIG. 2, which comprises a mobile communication device 2 as well as a positioning receiver 3. The mobile communication device 2 is e.g. a mobile communication device belonging to the GSM system and using a frequency range of 900 MHz. The positioning receiver 3 is e.g. a receiver applicable for receiving signals transmitted by satellites of the GPS system. This kind of positioning receiver usually comprises a plurality of reception channels, wherein a signal transmitted by more than one satellite can be received simultaneously, which can expedite the positioning. However, it should be evident that the invention can also be adapted in connection with other systems than the GSM and GPS systems. In addition, it should be evident that the invention can be applied also in connection with such electronic devices 1, wherein there is no mobile communication device 2, but, for example, only a positioning receiver 3.

Figure 1:
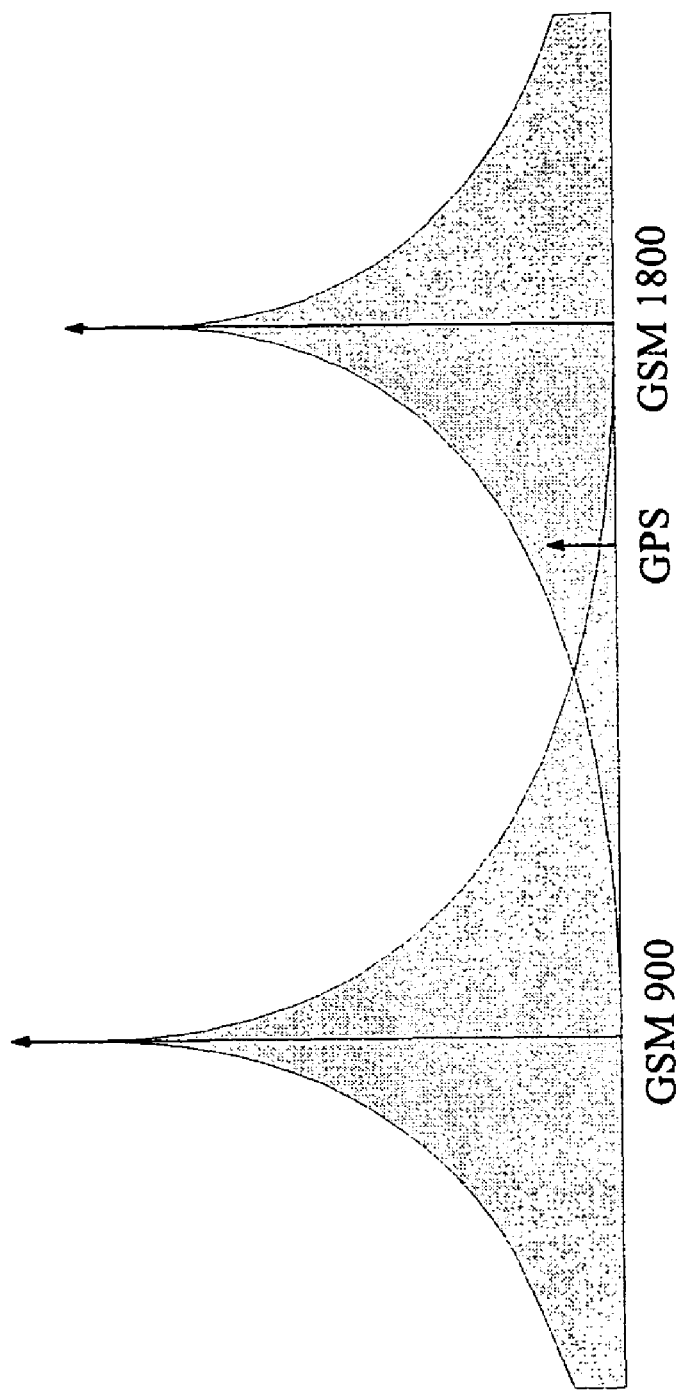
FIG. 1 shows an exemplary situation, in which interferences occur, as a function of frequency.
Figure 2:
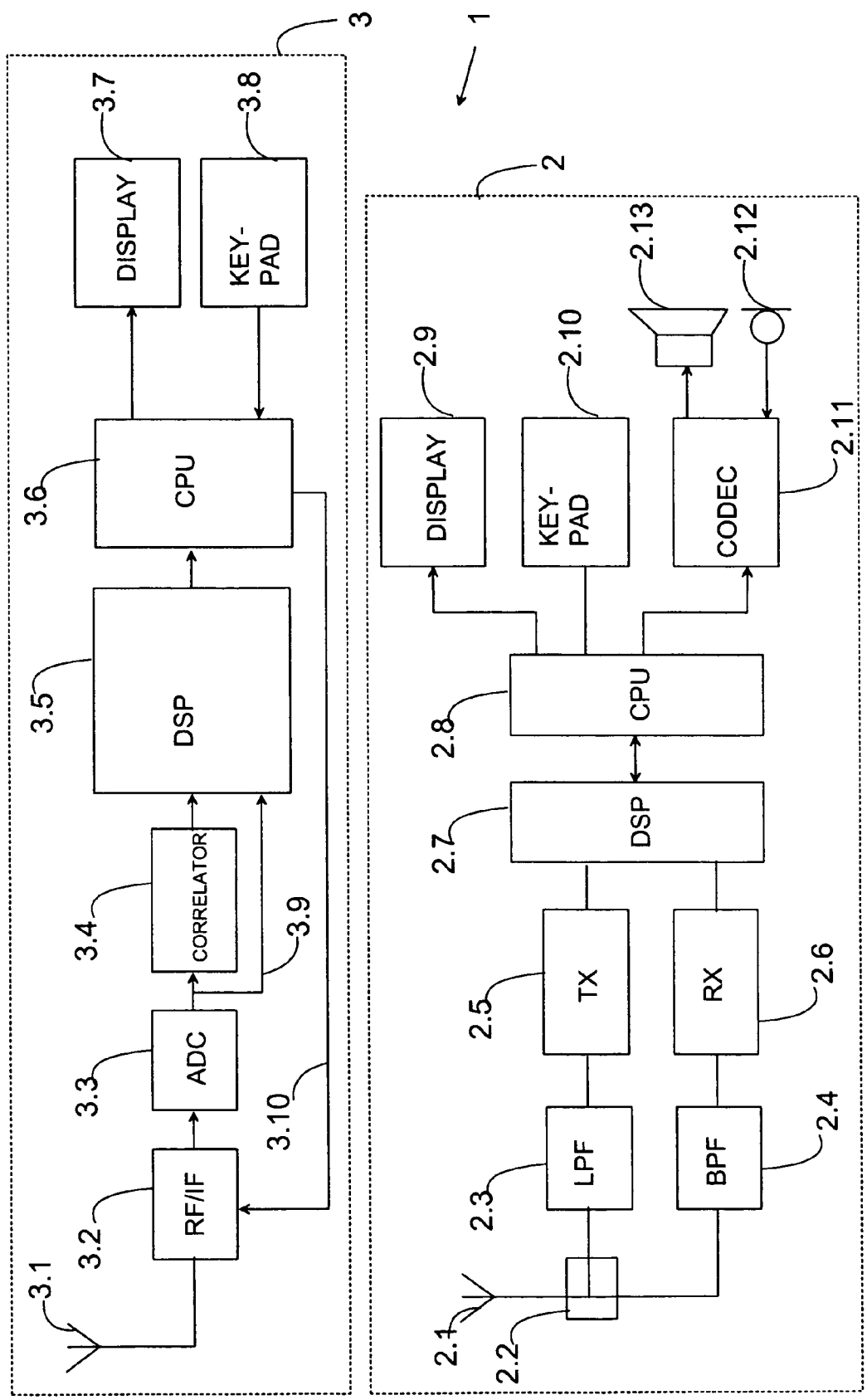
FIG. 2 shows an electronic device according to an advantageous embodiment of the invention in a simplified block diagram.

In FIG. 2 are presented the substantial characteristics from the point of view of the invention and it should be evident that in practical applications the electronic device 1 can include other functional blocks than the ones presented in FIG. 2. In addition, it should be mentioned that in FIG. 2, for the part of the positioning receiver 3, the blocks necessary for synchronization with the signal and for monitoring, such as a phase locked loop and a reference code generator, are not presented, but these are prior art known as such to any person skilled in the art.

The positioning receiver 3 comprises an antenna 3.1, via which the received signals are directed to the high frequency stage 3.2, wherein e.g. the amplification of the received signal and adapting it either to a low intermediate frequency or to a baseband is performed. The adapted signal is directed to the analog-to-digital converter 3.3, wherein a digital, sampled signal is formed of the signal. This sampled signal is directed e.g. to a correlator 3.4 or the like, wherein the signal is correlated with some reference code corresponding to the spreading code of the satellite. The correlation results can be used e.g. in establishing the code phase of the signals for synchronization with the signal. The correlation results are directed, for example, to a digital signal processor 3.5 (DSP) to be processed in positioning. Even though only one receiving block 3.2, 3.3, 3.4 is shown in FIG. 2, it should be evident that in practice in a positioning receiver there are several receiving blocks for receiving several different satellite signals simultaneously. A digital signal processor can transmit data to be handled also in the control block 3.6 (CPU). The control block 3.6 can show e.g. position information on the display 3.7 for the user of the electronic device. The user can control the positioning device with the keypad 3.8. The digital signal processor 3.5 can perform measurements of the noise level of the signal from the output of the analog-to-digital converter 3.3, i.e. on the basis of digitized samples. These samples can be directed to the digital signal processor 3.5 on the survey line 3.9. The control block 3.6 can adjust the operation of the high frequency stage 3.2 via the control line 3.10. These measurement and control functions will be presented later in this specification.

The mobile communication device 2 comprises also an antenna 2.1, via which the signals are received from a mobile communication network (not shown) and transmitted to the mobile communication network. In the antenna circuit there is an antenna switch 2.2 or the like, as well as filters 2.3, 2.4, with which the antenna 2.1 can be fitted to the transmitter 2.5, as well as to the receiver 2.6. The first filter 2.3 is advantageously a low pass filter and it is connected to the output of the transmitter 2.5 to attenuate the access of harmonic frequencies to the antenna 2.1. The second filter 2.4 is advantageously a bandpass filter, and signals, which are received with the antenna but not on the actual received frequency range, are attenuated with it, in which case mainly signals within the frequency range of the down link of the mobile communication network are directed to the receiver 2.6. In the mobile communication device 2 there is also advantageously a digital signal processor 2.7 for signal processing operations and a control block 2.8 for other control operations. In addition, the mobile communication device of the electronic device 1 according to FIG. 2 comprises a display 2.9, a keypad 2.10 and audio means, such as a codec 2.11, a microphone 2.12 and an earpiece/loudspeaker 2.13.

Even though in FIG. 2 an individual display 2.9, 3.7 and a keypad 2.10, 3.8 is shown for the mobile communication device 2 and the positioning means 3, it is also possible to use a shared display and/or keypad.

The following is a description of the operation of the method according to an advantageous embodiment of the invention in an electronic device 1 as shown in FIG. 2. Some statistical values are calculated from the signal received by the antenna and sampled in the analog-to-digital converter 3.3, on the basis of which it is possible to determine a noise level of the signal. However, it is not possible to separate thermal noise and the signals of the satellites from the received signal before the correlator 3.4. The interferences (noise) caused by other possible sources of interferences, such as the transmitter of a mobile communication device, are included in the signal as well. Thus the statistical values are values proportional with both thermal noise and the strength of the satellite signals. These types of statistical values are e.g. variance and standard deviation. In order to calculate these statistical values, the digital signal processor 3.5 of the positioning receiver 3 stores the measurement values for a set time, e.g. for 1 ms. After this, or already during storing, the digital signal processor 3.5 calculates one or more statistical values from the stored values, such as variance or standard deviation. The calculated statistical value is stored in a memory, such as in the inner registers (not shown) of the digital signal processor 3.5. The statistical values are stored from a longer time period to different memory locations. The storage period is e.g. some milliseconds or tens of milliseconds. Thus, it is possible to examine the variation of these statistical values during a storage period and to detect periodic and/or sporadic deviations. The digital signal processor 3.5 or control block 3.6 examines the stored statistical values and if it is possible to detect a clear change in them at some point in such a manner that it is possible to conclude that the total noise level has increased momentarily during that time, it can be concluded that in the point in question the transmitter of the mobile communication device 2 of the electronic device 1 or some other nearby transmitter has transmitted a signal.

The digital signal processor 3.5 calculates also control values for controlling the amplification of the high frequency stage 3.2 on the basis of the statistical values. Typically in the positioning receiver 3 the amplification control is performed in such a manner that the total noise level and the level of the signal included in it is optimal from the point of view of the analog-to-digital converter 3.3. This can normally be calculated as the average of the longer time period of the standard deviation. In the method according to the present invention, in an interference situation, statistical values from the entire measurement time are not used in calculating the control value, but the aim is to use only those statistical values, during which the transmitter has not been transmitting a signal. Therefore in this inference, the above-mentioned information on the increase of the total noise level is utilized. In other words, those statistical values, which have indicated a clearly detectable deviation in the noise level (to a greater noise level) are not used in calculating the control value. When carried out in this manner, the control value can be calculated to correspond better to the actual thermal noise level.

Figure 3:
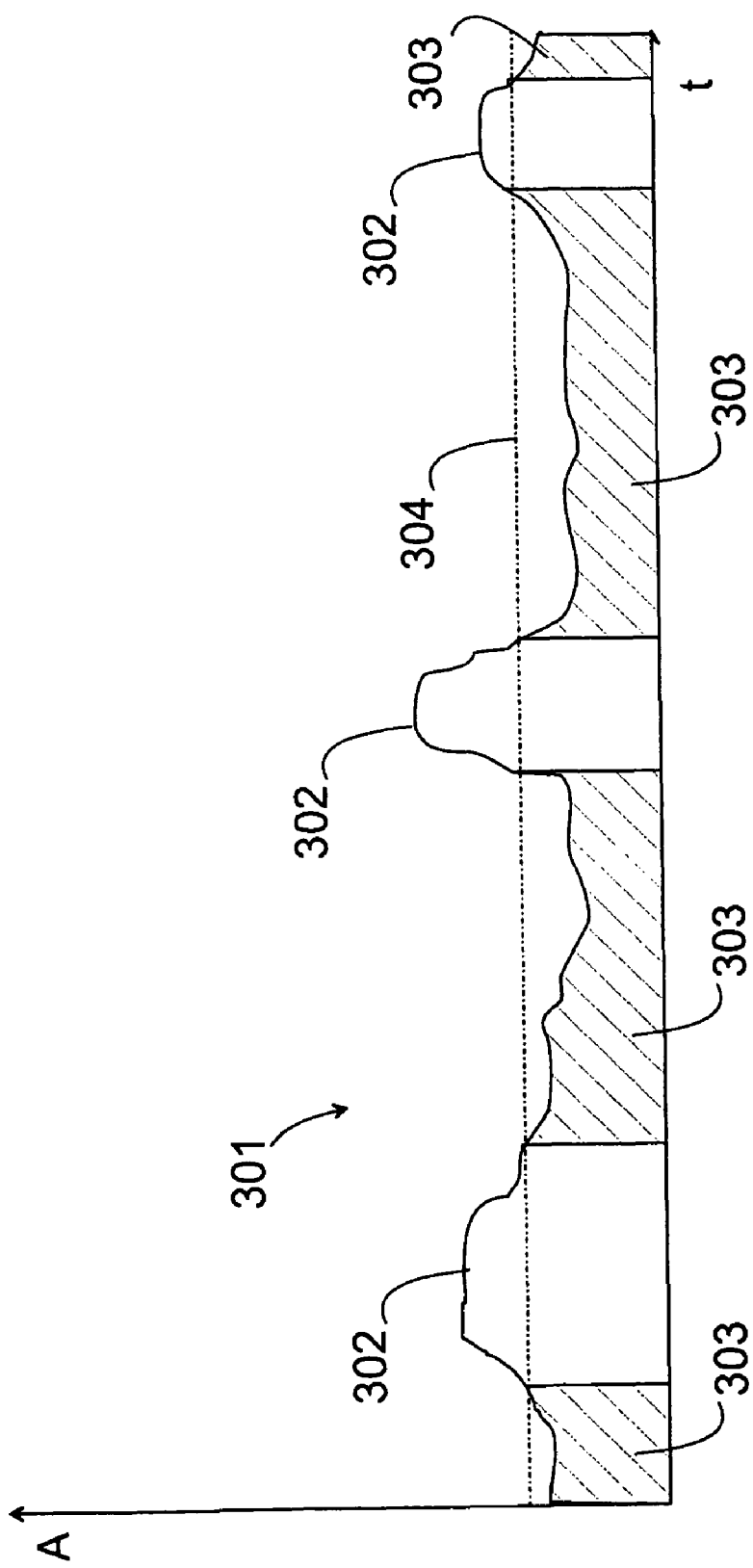
FIG. 3 shows, in a simplified manner, an example of the changes of noise level in a positioning receiver, caused by the transmitter of a mobile communication device.

FIG. 3 shows an example situation, wherein periodic interferences can be detected in the total noise level 301. These appear as greater values (marked with reference 302 in FIG. 3) of the total noise level. Thus, the amplification of the high frequency stage 3.2 is controlled on the basis of the noise levels 303 between the centers of interference 302. These areas are marked with slashes in the appended FIG. 3. In addition, the noise level 304 is marked in FIG. 3, which in the example situation in FIG. 3 is used as a limit value for determining the existence of interferences. However, the invention is not limited solely to using this type of one limit value, but other decision levels can also be used.

The method according to the invention makes it possible that the amplification of the high frequency stage 3.2 is optimal when the interference caused by the transmitters is not significantly included in the received signal. In a situation, wherein the interference level clearly rises, the strength of the signal directed to the analog-to-digital converter 3.3 increases strongly. When the interference level rises high enough, it also means that the analog-to-digital converter 3.3 falls into a saturated state, i.e. saturates. In this situation the output of the analog-to-digital converter 3.3 is at its maximum value, even if the strength of the input signal would still increase. In this type of a situation, the analog-to-digital converter 3.3 functions as a limiter. If the resolution of the analog-to-digital converter 3.3 is, for example, 3 bits, it means that in the digital signal formed by the analog-to-digital converter 3.3, the total noise level is only approximately 6 dB higher than the thermal noise level, even if the strength of the interfering signal were even tens of decibels higher than the thermal noise level.

Some decision levels (thresholds) are used in the positioning receiver 3, on the basis of which it is, for example, concluded whether a signal sent by the satellite is included in the signal. Another decision level is used in setting the operating mode of the positioning receiver 3 to, for example, a operating mode based on the signal/noise ratio.

When a strong interference signal is detected in the positioning receiver 3, it is possible in a positioning receiver 3 according to an advantageous embodiment of the invention to change the operating mode from a first operating mode to a second operating mode. In the first operating mode, the optimization of some decision levels is implemented only according to the thermal noise level. In another operating mode the optimization of the decision levels is performed according to the signal clipped in the analog-to-digital converter 3.3, i.e. according to the output level of the analog-to-digital converter 3.3. Thus, in setting the decision levels it is possible to take into account the rise in the noise level caused by the interferences in the output of the analog-to-digital converter 3.3. This rise in the noise level is, however, only around 6 dB, if the resolution of the analog-to-digital converter is 3 bits. This indicates a decrease of only approx. 10 to 20% in performance, while without the control operation according to the invention performance would decrease to be significantly worse. In some situations it may even happen that the positioning cannot be performed at all in the solution according to prior art. The positioning receiver 3 according to the invention can, thus, adjust to interference situations. Also, the positioning receiver does not have to have information on which mobile communication system (e.g. GSM, CDMA, WCDMA, US-CDMA, etc.) the mobile communication device 2 belongs to.

Integration of the received signal is performed in the positioning receiver 3 at set intervals. The length of this type of an integration period is advantageously an epoch or its multiple. In the method according to an advantageous embodiment of the invention, it is possible to still further decrease the rise in the noise level caused by the interference in such a manner that the integration phases during the interference are left unnoticed in the positioning receiver 3. In addition, the timing of the integration periods can be aimed to be synchronized from the point of view of burst periodic interferences to such that the interference situations are not simultaneous with the integration periods. In the synchronization it is possible to utilize information on the timing of the signals of a mobile communication system, especially when the aim is to eliminate the interferences caused by the mobile communication device 2 of the electronic device 1 itself.

It should be understood that the present invention is not limited solely to the above-presented embodiments but it can be modified within the scope of the appended claims.

The invention claimed is:

1. A method, comprising:
   receiving a signal transmitted by a satellite of a positioning system in a receiver of a positioning device,
   amplifying the received signal,
   determining a noise level of the received signal in the receiver of the positioning device,
   establishing times of existence of a periodic interference based on changes in the determined noise level, and
   controlling an amplification for the received signal based only on the noise level of the signal received between the established times of existence of the periodic interference and not the signal received during the established times of existence of the periodic interference, and performing positioning based only on signals received between the established times of existence of the periodic interference.

2. The method according to claim 1, wherein determining the noise level of the received signal comprises:
converting the received signal to digital samples,
calculating statistical values on the basis of the samples,
determining the noise level based on the statistical values, and
searching for stronger noise levels from the noise level, wherein the existence of the established times of existence of the periodic interference is determined based on the stronger noise level.

3. The method according to claim 2, comprising using variance or standard deviation for said calculating said statistical values.

4. The method according to claim 1, wherein the receiver of the positioning device has at least a first operating mode and a second operating mode, the method further comprising:
setting the receiver of the positioning device to function in said second operating mode between the established times of existence of the periodic interference, and otherwise setting the receiver of the positioning device to function in said first operating mode.

5. The method according to claim 4, comprising using at least one threshold value for comparing samples formed based on the received signal to said at least one threshold value in order to establish whether there is a positioning signal in the received signal, and determining said at least one threshold value for both the first operating mode and the second operating mode.

6. An electronic device, which comprises at least a positioning receiver, said positioning receiver comprising:
an antenna, configured to receive a signal transmitted by a satellite of a positioning system,
an amplifier, configured to amplify the received signal, and
a digital signal processor, configured to:
determine a noise level of the received signal,
determine times of existence of a periodic interference based on changes in the determined noise level, and
control an amplification of the amplifier based only on the noise level of the received signal received between the times of existence of the periodic interference and not based on the signal received during the times of existence of the periodic interference, and
perform positioning based only on signals received between the established times of existence of the periodic interference.

7. The electronic device according to claim 6, wherein said positioning receiver further comprises an analog-to-digital converter configured to convert the received signal to digital samples, and wherein said digital signal processor is configured to calculate statistical values based on the samples, determine a noise level based on the statistical values, search higher noise levels from the noise level, and determine the times of existence of the periodic interference based on the higher noise level.

8. The electronic device according to claim 6, wherein the positioning receiver has at least a first operating mode and a second operating mode, and wherein between the times of existence of the periodic interference the positioning receiver is configured to function in said second operating mode, and otherwise in said first operating mode.

9. The electronic device according to claim 8, wherein said digital signal processor is configured to compare digital samples formed based on the received signal in order to determine whether there is a positioning signal in the received signal, and at least one threshold value is determined to be used for both the first operating mode and the second operating mode.

10. The electronic device according to claim 6, further comprising a communication device configured to perform mobile communication functions.

11. A computer program product comprising a non-transitory computer readable storage medium having program codes stored thereon for use by a positioning receiver, said program codes comprise:
instructions for receiving a signal transmitted by a satellite of a positioning system,
instructions for amplifying the received signal,
instructions for determining a noise level of the received signal in the positioning receiver,
instructions for establishing times of existence of a periodic interference based on changes in the determined noise level,
instructions for controlling an amplification for the received signal based only on the noise level of the received signal received between the established times of existence of the periodic interference and not based on the received signal during the established times of existence of the periodic interference, and
instructions for performing positioning based only on signals received between the established times of existence of the periodic interference.

12. The method of claim 2, wherein statistical values from samples received during the established times of existence of the periodic interference are not used in determining the noise level.

13. The electronic device of claim 7, wherein statistical values from samples received during the times of existence of the periodic interference are not used in determining the noise level.

14. The method of claim 2, comprising only calculating statistical values for samples received between the established times of existence of the periodic interferences.

15. The method of claim 2, comprising only determining a noise level based on statistical values calculated from samples received between the established times of existence of the periodic interference.

16. The electronic device of claim 6, comprising only calculating statistical values for samples received between the times of existence of the periodic interference.

17. The electronic device of claim 6, comprising only determining a noise level based on statistical values calculated from samples received between the times of existence of the periodic interference.

* * * * *